Figure 1:
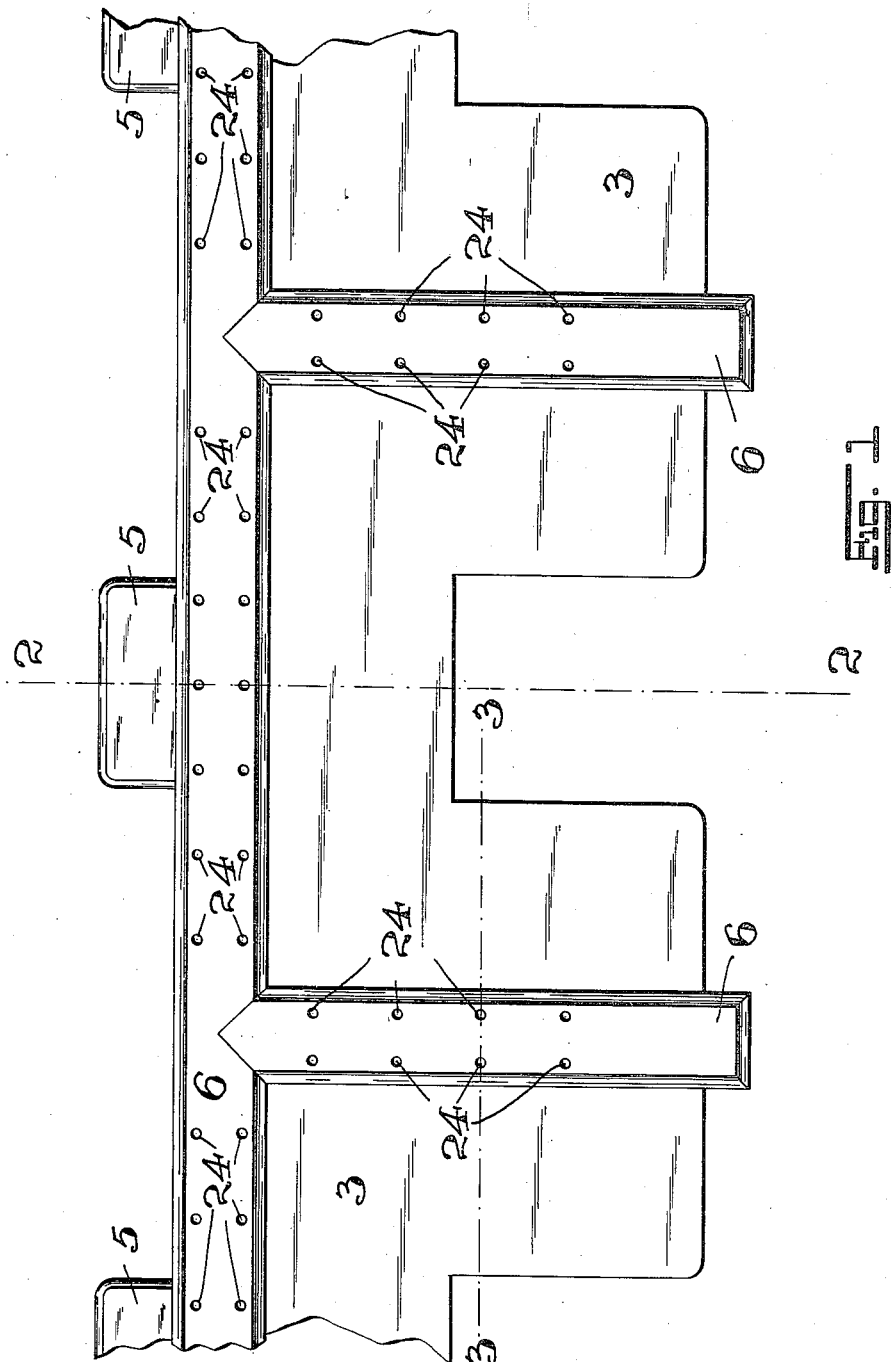

W. H. SPENCER.
ILLUMINATING DEVICE.
APPLICATION FILED DEC. 27, 1910.

1,007,498.

Patented Oct. 31, 1911.
4 SHEETS—SHEET 1.

W. H. SPENCER.
ILLUMINATING DEVICE.
APPLICATION FILED DEC. 27, 1910.

1,007,498.

Patented Oct. 31, 1911.

4 SHEETS—SHEET 3.

WITNESSES:
Fredk. H. W. Fraentzel
Harry E. Pfeiffer

INVENTOR:
William H. Spencer,
BY Fraentzel and Richards,
ATTORNEYS

W. H. SPENCER.
ILLUMINATING DEVICE.
APPLICATION FILED DEC. 27, 1910.
1,007,498.
Patented Oct. 31, 1911.
4 SHEETS—SHEET 4.
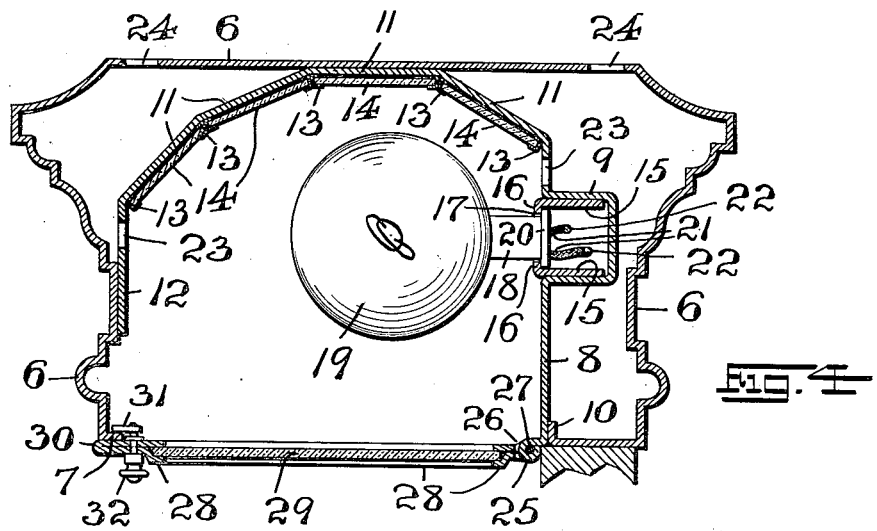
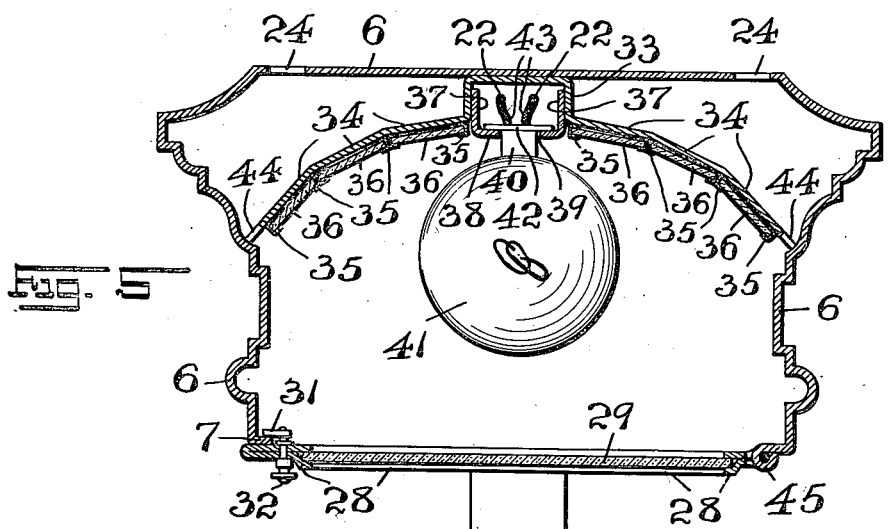
WITNESSES:
INVENTOR:
William H. Spencer,
BY Fraentzel and Richards,
ATTORNEYS

UNITED STATES PATENT OFFICE.

WILLIAM H. SPENCER, OF NEW YORK, N. Y., ASSIGNOR TO GEORGE FRINK SPENCER, OF NEWARK, NEW JERSEY.

ILLUMINATING DEVICE. REISSUED

1,007,498. Specification of Letters Patent. Patented Oct. 31, 1911.

Application filed December 27, 1910. Serial No. 599,470.

*To all whom it may concern:*

Be it known that I, WILLIAM H. SPENCER, a citizen of the United States, residing at New York, in the county of New York and State of New York, have invented certain new and useful Improvements in Illuminating Devices; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in illuminating devices; and, the invention refers, more particularly, to a novel construction of illuminating device adapted to be used in connection with bank-screens or partitions, counters, cashier-cages, and similar arrangements.

The present invention has for its principal object to provide an illuminating device comprising the combination of a cornice, light diffusing reflectors, and lighting units, all being combined and arranged in such a manner, so that when placed in proper position upon a partition or screen, such for example as are used in banks for separating the different departments, the light-rays will be properly directed and redirected so as to throw the maximum light-flux upon the area to be illuminated, such as the desks or counters usually forming a part of the partitions or screens used in banks, counting houses, factory-offices, and the like.

A further object of the present invention is to provide a novel and simple construction of illuminating device which may be artistically or ornamentally combined with screens or partitions; and, which will give a proper distribution of light in a desired area, but which will shield or screen the direct light from the eye, and will cause, furthermore, a soft and evenly diffused light upon the working surface or surfaces, the direct glare of the light being eliminated.

Other objects of the invention not at this time more particularly enumerated, will be clearly understood from the detailed description of the present invention.

With the various objects of the present invention in view, the said invention consists, primarily, in the novel construction of illuminating devices hereinafter set forth; and, furthermore, this invention consists, in the novel arrangements and combinations of the various devices and parts, as well as in the details of the construction of the said parts, all of which will be hereinafter more fully described, and then finally embodied in the clauses of the claim which are appended to and which form an essential part of this specification.

The invention is clearly illustrated in the accompanying drawings, in which:—

Figure 2:
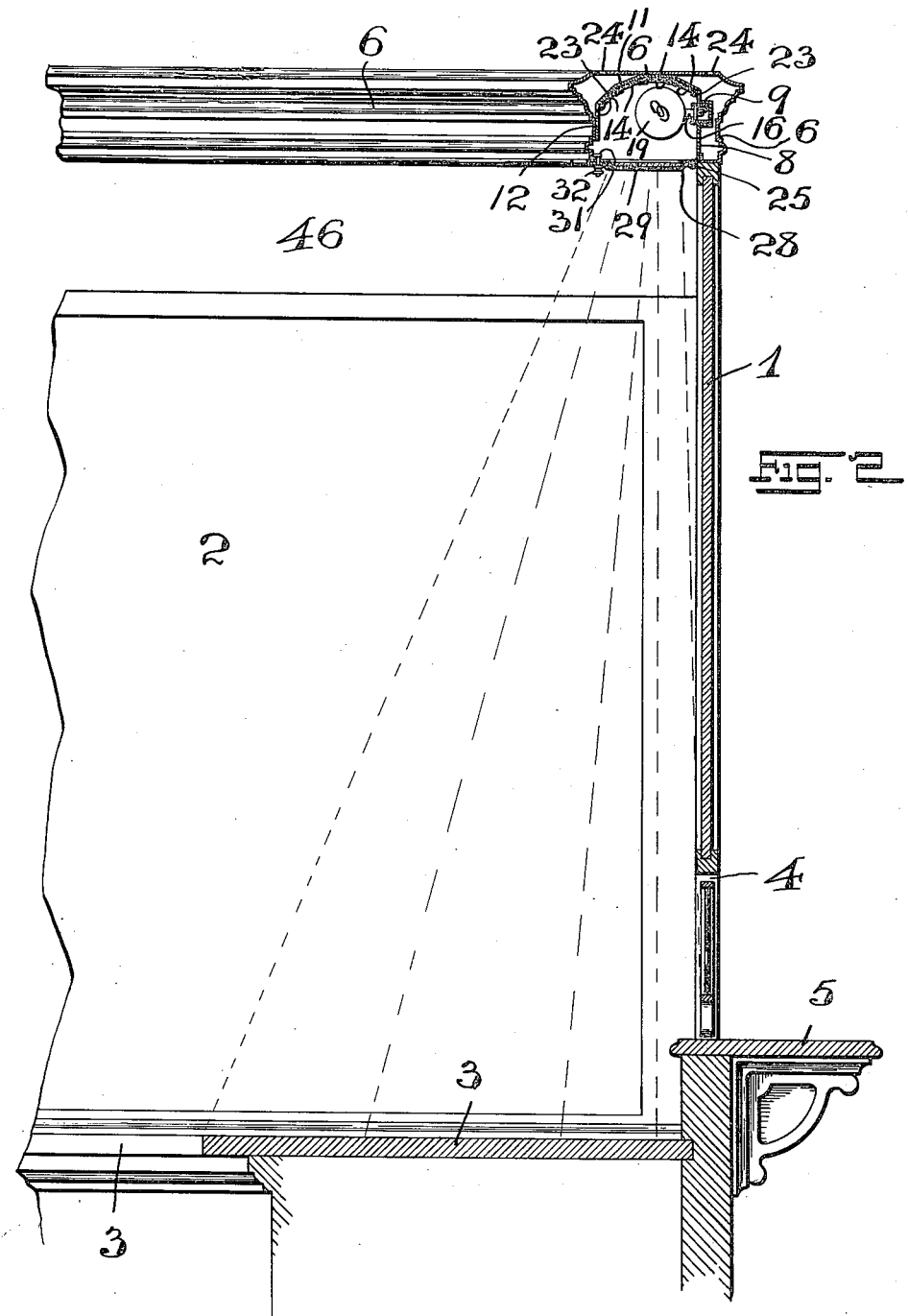
Figure 3:
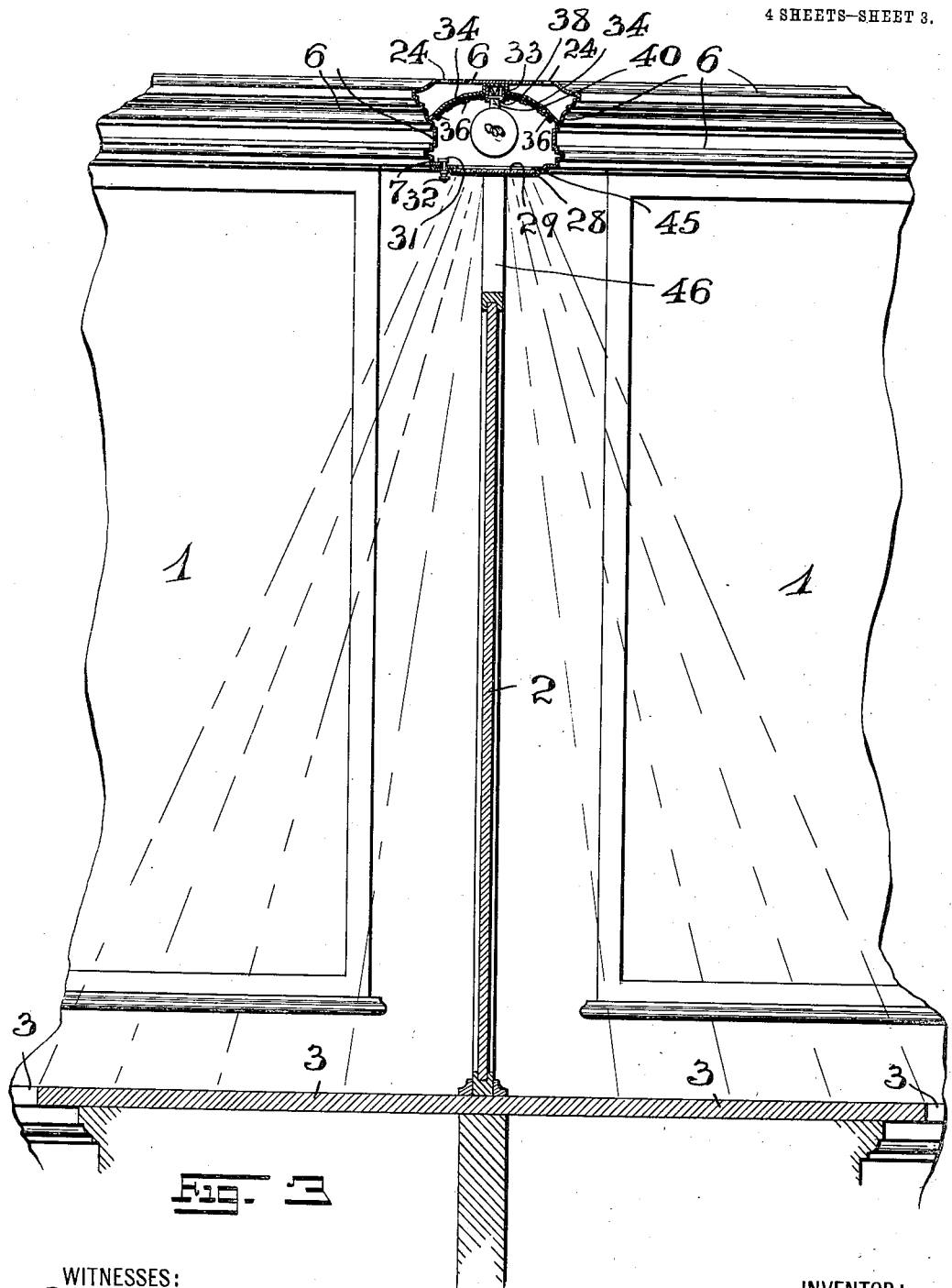

Figure 1 is a plan or bird's-eye view of a portion of bank-partition or screen provided with the stall or cage-partitions and the counters or desks arranged therewith, the same being provided with the novel illuminating devices constructed according to and embodying the principles of the present invention. Fig. 2 is a transverse vertical section of the devices and parts represented in said Fig. 1, said section being taken on line 2—2 in said Fig. 1, and the said view being made on an enlarged scale. Fig. 3 is a vertical cross-section taken on line 3—3 in said Fig. 1, this view being also made on an enlarged scale. Fig. 4 is a transverse vertical section of the novel illuminating device connected with the main partition or screen, similar to that shown in Fig. 2, but the said view being made upon a much enlarged scale; and Fig. 5 is a large detail vertical cross-section of the novel illuminating device connected with the stall or cage-partitions, similar to that shown in Fig. 3.

Similar characters of reference are employed in all of the above described views, to indicate corresponding parts.

Referring now to the said drawings, the reference-character 1 indicates a main partition or screen, such for example as is used in banks, counting houses, factory-offices, stores, and the like; and the reference-character 2 indicates the stall or cage-partitions connected therewith, extending transversely with relation to the main partitions or screen 1, and adapted to separate the various bank-departments, or other departments from each other, as will be clearly evident from an inspection of said Fig. 1 of the drawings. Connected with said main partition or screen 1, and said stall or cage-partitions, are the usual desks or counters 3, the said main partitions or screen being further provided with the usual openings or windows 4 and the window ledges 5.

The novel illuminating device connected with the said main partition or screen 1 is of the general configuration and construction hereinafter more fully set forth, and the same is secured upon the upper portion of the said partition or screen 1, so as to extend along its entire length. This illuminating device comprises a casing or shell 6, said casing or shell 6 being constructed and ornamented in such a manner, so as to take the place of the ordinary ornamental cornice with which such partitions or screens are usually provided, and thus in itself providing a cornice for the said partition or screen. The said cornice-casing 6, as it may be termed, overhangs the inner side of the said main partition or screen 1, and the same is provided on its under side with a longitudinally extending opening, along one margin of which extends an inwardly projecting ledge or flange 7. Arranged within the interior of said cornice-casing 6 is the shell of a reflector-shell, said shell extending in a longitudinal direction throughout the inner portion of the reflector. Said reflector-shell comprises an upright wall or member 8 which is provided with an outwardly projecting trough-like member 9, the said upright wall or member 8 may be secured, in any suitable manner, to a suitable flange or rib 10 with which said cornice-casing 6 may be provided. Connected with the upper portion of said upright wall or member 8 is a series of reflector-supporting facets or faces 11, the same extending across the upper interior part of the said cornice-casing 6, and being arranged at proper angles to support a suitable number of reflecting elements in a manner to properly direct and reflect the light of one or more light-units in desired directions. Connected with said reflector-supporting facets or faces 11 is another upright wall or member 12, the same being secured, in any suitable manner, to some convenient part of the walls of said cornice-casing 6. Properly disposed and connected with said reflector-supporting facets or faces 11 are suitably formed channel-bars 13, the same serving to support and retain upon said reflector-supporting facets or faces 11, suitable reflector-members or elements 14, the latter being preferably made of silvered glass of any desirable form. Said trough-like member 9, which provides a wiring conduit or trough, is adapted to receive the walls 15 of a light or lamp-supporting member 16, to retain the latter in its proper position and to support lighting units in proper relation to said wiring-conduit or trough, and said reflector-members. Said lamp-supporting member 16 is provided, at suitable distances, preferably twelve inches apart, with holes or perforations 17, adapted to receive the sockets or brackets 18 of suitable lamps 19, each socket or bracket 18 being provided with a marginal flange 20 for engaging the inner side of said lamp-supporting member 16. The wires 21 of the lamps 19 extend through the said sockets or brackets 18 and penetrate within said wiring-trough, where the same are properly and electrically connected in circuit with the main line or feed-wires 22. The upright walls or members 8 and 12 are also provided with a plurality of holes or openings 23 for the purposes of ventilation and for carrying away, from the interior of the said reflector-shell, the heat generated by the said lamps. In like manner, the said cornice-casing is also provided with a plurality of holes or openings 24 in its upper wall, which provide an outlet for the heat within said reflector-shell and the cornice-casing which collects from said lamps, thus keeping the interior of the various devices and parts cool, and consequently prolonging the life of the lamps. Disposed along the lower marginal edge of said upright wall or member 8 is a suitably formed hinge-element 25 to which is pivotally connected, by means of corresponding hinge-elements 26 and a pintle 27, a frame 28 designed to support across the opening in the bottom of said cornice-casing 6 a light-diffusing and softening screen 29, the latter being preferably made of ground glass, or some similar and suitable material. The outer marginal edge 30 of the said frame 28 is provided with suitable latch-members 31, said members 31 being formed with manipulating knobs 32, and the said latch-members being adapted to engage the inwardly projecting ledge or flange 7 of the cornice-casing 6 to retain said frame 28 and screen 29 in their operative positions. Said frame 28 may be divided into suitable sections, of any desired lengths, so that the same may be conveniently opened to give access to any part of the interior of said cornice-casing 6, as will be clearly evident.

As thus constructed and arranged, with relation to the said partition or screen 1, the novel illuminating device herein-above described not only provides an ornamental completion of said partition or screen 1, but also so disposes of the lighting units and reflecting members, that the best light-efficiency and light diffusion is produced. The reflector-members 14 are disposed at such suitable angles, so that a maximum light-flux is directed over the entire working surface of the desk or counter 3; and, furthermore, the high reflecting and concentrating power of the said reflector-members 14 permits the use of lamps of approximately low candle-power. Said lamps being spaced at proper and suitable intervals throughout the length of said cornice-casing 6, and their light being directed from the various reflector-points or sources, causes such a distribution of light as to enable the clerk to work in any position, when writing either left-hand or right-hand, without producing annoying shadows. Furthermore, the use of said softening and diffusing screen 29 screens the direct light from the eyes of the clerk or clerks, and causes an even and soft diffusion of the light, without glare, upon the working surface of said desk or counter.

Usually in the construction of bank-partitions or screens, what are termed stall or cage-partitions are provided for the purpose of separating the various public windows and departments from each other. In such construction, the said stall or cage-partitions 2 are also provided with the said cornice-casings 6 which are arranged to join or abut the said cornice-casing 6 of the main partitions or screen 1, substantially as illustrated in Fig. 1 of the drawings. Said cornice-casing 6 in such case, however, is so arranged as to overhang each side of the stall or cage-partition, and the interior arrangement of the reflector-members and lighting-units within said cornice-casing 6, thus disposed, is slightly modified to meet the requirements of this construction. The arrangement of the said cornice-casing 6, and its slightly modified interior construction upon a stall or cage-partition is clearly illustrated in Figs. 3 and 5 of the accompanying drawings. In this construction, the reflector-shell is supported within the upper interior part of said cornice-casing 6, the said reflector-shell comprising a trough-like member 33, which provides a wiring-trough or conduit, the same being centrally disposed and extending longitudinally throughout the length of said cornice-casing. Extending from each side of said trough-like member 33 is a set of reflector-supporting facets or faces 34, the free marginal edges of which may be suitably secured to the respective walls of the said cornice-casing 6. Properly disposed and connected with said reflector-supporting facets or faces 34 are channel-like bars 35, which serve to support and retain upon said reflector-supporting facets or faces 34 suitable reflector-members or elements 36, the latter being preferably made of silvered glass of any desirable form, or other similar and suitable material. Said trough-like member 33 is adapted to receive the walls 37 of a light or lamp-supporting member 38, to retain the latter in its proper position so as to support lighting-units in proper relation to said wiring-trough or conduit and the said reflector-members. Said lamp-supporting member 38 is provided, at suitable intervals, preferably twelve inches apart, with holes or openings 39 adapted to receive the sockets or brackets 40 of lamps 41, each socket or bracket 40 being provided with a marginal flange 42 for engaging the inner side of said lamp-supporting member 38. The wires 43 of each lamp 41 extend through said sockets or brackets 40 and penetrate within the said wiring-trough or conduit, where they are properly and electrically connected in circuit with the main line or feed wires 22, arranged within said wiring-trough or conduit. Said reflector-shell is provided, adjacent to its marginal edges, with suitable openings 44 providing means for ventilating and carrying off the heat generated by said lamps, said heat finally escaping through the holes or openings 24 with which said cornice-casing 6 is provided, substantially in the manner hereinabove described. Said cornice-casing 6 is also provided with a pivotally connected frame 28, and a light-diffusing and softening screen 29, hereinbefore described, the same being connected, however, by means of a hinge element 45 with which one wall of the said cornice-casing 6 is provided. The said frame 28 is also provided with the latch-members 31 and manipulating knobs 32, the former of which engages said ledge or flange 7 of said cornice-casing 6, in the manner herein-above set forth.

The stall or cage-partition 2 is provided with open or cut-away spaces 46 lying directly beneath the illuminating devices, so that the light may be directed and diffused upon the surfaces of the desk or counter, upon either side of the said stall or cage partition. The reflector-members 36 are arranged in such a manner, so that the maximum flux of light from the lamps 41 is directed upon said desk or counter-surfaces upon both sides of said stall or cage partition, whereby this arrangement of the devices and parts has all the efficiency and attributes hereinabove mentioned.

It will thus be understood, that by means of the present invention, I have produced a novel construction of illuminating device peculiarly adapted for use with that class of partitions used in banks, counting-houses, factory-offices, stores, and for all similar work and purposes, the same presenting a sightly concealment of the lighting unit or units, and at the same time locating the same and controlling the light generated thereby, in such a manner, so as to gain a maximum efficiency of light-tone, diffusion, and distribution.

I am aware that changes may be made in the general arrangements and combinations of the various devices and parts, as well as in the details of the construction of the same, as described in the accompanying specification, and without departing from the scope of my present invention as defined in the claim appended hereto. Hence, I do not limit my present invention to the exact arrangements and combinations of the devices and parts as set forth in the foregoing specification, nor do I confine myself to the exact details of the construction of the said parts, as illustrated in the accompanying drawings.

I claim:

An illuminating device comprising a cornice-casing provided with a longitudinally extending opening in the bottom thereof, a reflector-shell extending longitudinally within the interior of said cornice casing, reflector members supported by said reflector-shell, a plurality of lamps or lighting units supported beneath said reflector-shell and its reflector-members, and a light-softening and diffusing screen pivotally supported across said longitudinally extending opening in the bottom of said cornice-casing, substantially as and for the purposes set forth.

In testimony, that I claim the invention set forth above I have hereunto set my hand this 14th day of December, 1910.

WILLIAM H. SPENCER.

Witnesses:
ALBERT P. BENITO,
CHAS. K. WYATT.